United States Patent Office 2,752,324
Patented June 26, 1956

2,752,324

DYEABLE FIBER-FORMING MIXTURES OF ACRYLONITRILE POLYMERS AND ALKENYL HALOACETATE POLYMERS

Alfred B. Craig and George E. Ham, Decatur, Ala., assignors to The Chemstrand Corporation, Decatur, Ala., a corporation of Delaware No Drawing. Application March 2, 1953,
Serial No. 339,911

20 Claims. (Cl. 260—45.5)

This invention relates to polymeric compositions having unusual fiber-forming properties. More specifically, the invention relates to polymeric acrylonitrile compositions capable of being converted readily into dyeable general purpose fibers.

This application is a continuation-in-part of our copending application Serial No. 208,088, filed January 26, 1951, now U. S. Patent No. 2,719,834.

It is well-known that polyacrylonitrile, and various copolymers of acrylonitrile and other olefinic monomers, can be spun into synthetic fibers having unusual physical properties. Because polyacrylonitrile and the many copolymers of acrylonitrile are almost inert chemically, conventional dyeing procedures are not useful in processing them. Many copolymers of acrylonitrile have been prepared using as the comonomer substances which impart dye affinity. Copolymers of this type are not always satisfactory because of the excessive cost of the dye-receptive comonomers and because the introduction of such substances often depreciates the desirable fiber-forming characteristics of the copolymer.

The primary purpose of this invention is to provide a new acrylonitile polymer composition which has the chemical and physical properties of polyacrylonitrile, and which can be made completely dye-receptive by simple readily practicable procedures. A further purpose of this invention is to provide a means for converting non-dyeable acrylonitrile polymers into a dye-receptive form. A still further purpose is to provide new general purpose synthetic fibers.

In accordance with this invention it has been found that polyacrylonitrile and other non-dyeable polymers of acrylonitrile, for example the polymers of over 80 percent acrylonitrile and up to 20 percent of other olefinic monomers, such as vinyl acetate, styrene, alpha-methylstyrene, methacrylonitrile, vinyl chloride, vinylidene chloride, and the various alkyl acrylates, alkyl methacrylates, alkyl fumarates, and alkyl maleates wherein the alkyl groups have up to four carbon atoms may be readily converted into dyeable polymers. This is achieved by blending the non-dyeable polymers with polymeric compositions derived by the polymerization of unsaturated esters of haloacetic acid which polymeric compositions have been previously treated or are thereafter treated in the blended form with mercapto-substituted heterocyclic nitrogen compounds. Suitable monomers for polymerization into the useful polymeric compositions are those represented by the generic formula:

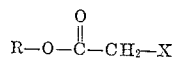

wherein X is a halogen atom and R is a radical selected from the group consisting of vinyl, allyl, methallyl and isopropenyl. Suitable monomeric substances include vinyl chloroacetate, allyl chloroacetate, methallyl chloroacetate, isopropenyl chloroacetate, and the corresponding bromine analogues.

The proportions of the unsaturated halogen containing polymer will depend upon the degree of dye-receptivity desired, and upon the proportion of the alkenyl chloroacetate in the blending polymer. In general, it is desirable to have from two to 20 percent of the fiber-forming composition in the polymeric form of the alkenyl chloroacetate. Thus, if the blending polymer is 100 percent alkenyl chloroacetate polymer, from two to 20 percent will be required to develop suitable dye-receptivity. If a copolymer of the chloroacetate and another monomer is used, proportionately more will be required to obtain the desired end result. Polymers of more than 30 percent of the haloacetate monomers and up to 70 percent of another olefinic monomer may be employed. These other monomers may be acrylonitrile, methacrylonitrile, vinyl acetate, vinyl chloride, vinylidene chloride, styrene, alpha-methylstyrene, and the various alkyl acrylates, alkyl methacrylates, alkyl fumarates, and the alkyl maleates, wherein the alkyl radicals have up to four carbon atoms. Because polymers of acrylonitrile have unusual solvent and chemical resistance the preferred blending polymer is one of substantial portions of acrylonitrile and sufficient of the chloroacetate monomer to develop dye-receptivity in the portions to be blended with the fiber-forming acrylonitrile and 50 percent of the alkenyl chloroacetate, for example methallyl chloroacetate.

The base polymers are preferably prepared in an aqueous medium in the presence of a water-soluble peroxy catalyst and in the presence of an agent which maintains the polymer in a fine but granular dispersed condition. Suitable peroxy catalysts are the alkali metal persulfates and suitable dispersing agents are the alkali metal salts of sulfonated hydrocarbons. Polymerization may be conducted by batch procedures, by continuous procedure or by combinations of these procedures. A preferred method of preparation involves a batch procedure wherein the desired monomers are mixed and charged gradually throughout the polymerization. Unusually uniform polymers may be obtained by also charging the catalyst and emulsifier continuously or in increments throughout the course of the reaction. More uniform polymerization conditions may be achieved by operating at uniform temperatures, for example the reflux temperature of the medium, especially if the operation is so conducted as to provide a constant temperature at reflux.

If desired, the polymerization reaction may be conducted in the presence of a "redox" agent, for example, sulfur dioxide, sodium bisulfite, sodium thiosulfate, or other sulfur compounds in which the sulfur is present in an oxidizable condition. Other optional procedures may involve the use of regulators which serve as chain terminators to prevent the formation of very high molecular weight increments, agents of this type being t-dodecyl mercaptan, thioglycolic acid, and dithioglycidol.

The procedure for preparing blending polymer is substantially the same as that used in the preparation of the base polymer. However, the blending polymer may be prepared by other known polymerization methods such as mass polymerization or suspension polymerization.

In order to convert the fiber-forming blends containing an increment of the chloroacetate polymers into readily dyeable forms, it is necessary to react the chloroacetate group with a compound which will introduce an amino nitrogen atom. Suitable reagents of this type are the mercapto substituted heterocyclic nitrogen compounds and the alkali metal salts thereof.

In this manner a nitrogen atom is introduced into the molecule which will provide a nucleous for chemical reaction with conventional acid dyestuffs. Suitable compounds of this type for use in the development of dye-receptivity are mercaptobenzothiazole, 2-mercaptopyridine, 3 - mercapto - 1,2,4-triazole, 2-mercapto-4,5-benzo- 1,3 - triazine, 2 - mercaptobenzothiazine, 2 - mercapto - 4-phenylthiazole, 3-mercapto-5-phenyl-1,2,4-triazine, 2-mercaptobenzoxazole, 1 - phenyl - 3 - mercapto - 1,2,4-triazolone-5, and other mercapto substituted compounds containing nitrogen hetero rings and the mercapto groups substituted on a carbon atom of the ring, as well as the alkali metal salts of any of these compounds.

The polymer may be treated with the mercapto substituted heterocyclic nitrogen compounds in granular solid state, in solution in a suitable solvent, and in the form of a spun fiber. If the polymer is in solid form, obviously only the surface will be reacted chemically, and if the polymer is treated in solid form before spinning the activated surface may be substantially diluted when the polymer is dissolved and reformed into fibers. Accordingly, the most effective procedure involves chemical treatment in solution state. This modification may take place in the spinning solution from which the fibers will ultimately be prepared. Accordingly, the polymers are each dissolved, separate or together in suitable solvents, for example, N,N-dimethylformamide, gamma-butyrolactone, ethylene carbonate, or other conventional polyacrylonitrile solvents. On the contrary, the modification of a haloacetate-containing blending polymer may be carried out while the blending polymer is in solution in one of the above-named solvents, and the resulting treated polymer solution can then be blended with a solution of the base polymer in the same, or compatible, solvents.

In the practice of this invention the dyeable fiber-forming compositions are prepared by mixing the solid polymers in suitable conventional mechanical mixers, for example, Banbury mixers, roll mills, or dough mixers. In general, it is desirable to add the solvents or plasticizers for fiber-forming acrylonitrile polymers. The intimate mixing of the polymers or blended polymers with the reagent may induce the reaction of substantially all of the chloroacetate groups. Less thorough mixing, and especially if the polymer solutions are quite viscous will induce the reaction of only a small proportion, for example from five to 50 percent of the chloroacetate groups with the reactant. Under such conditions it will be necessary to add more of the chloroacetate polymers in order to develop the desirable extent of dye-receptivity. Thus, the manner of mixing and the viscosity of the blending mixture must be considered in selecting the proper proportions of polymers.

The new blended compositions may be fabricated into synthetic fibers by conventional wet or dry spinning procedures. After stretching the fibers to develop the necessary orientation and the incident tensile strength, and thereafter shrinking the fibers to improve their thermal resistance, valuable general purpose fibers are obtained.

Further details of this invention are set forth with respect to the following examples:

*Example I*

A skein of fibers (0.6 gram) composed of a blend of a copolymer of 97 percent acrylonitrile-3 percent vinyl acetate and a copolymer of 60.5 percent acrylonitrile-39.5 percent methallyl chloroacetate, with an overall methallyl chloroacetate content of 8 percent was immersed for five minutes at 100° C. in a mixture consisting of 1.89 grams of mercaptobenzothiazole, 0.45 gram of sodium hydroxide and 60 mls. of water. The fiber was then washed and dried. The fiber was then dyed in a dye bath containing 0.6 ml. of 2 percent Wool Fast Scarlet, 3.0 mls. of five percent sulfuric acid, and 24 mls. of distilled water for one hour at 100° C. A deep scarlet fiber was produced. A similar fiber which was not treated with mercaptobenzothiazole was dyed a very light shade.

*Example II*

The procedure of Example I was duplicated, except that a copolymer of 67.4 percent acrylonitrile-32.6 percent vinyl chloroacetate was blended with a copolymer of 97 percent acrylonitrile-3 percent vinyl acetate to give an overall vinyl chloroacetate content of 8 percent. Fibers produced from this composition were treated with mercaptobenzothiazole as in Example I. The resulting fibers dyed well with Wool Fast Scarlet, Alizarin Light Blue 4GL, and Wool Fast Yellow dyes.

We claim:

1. A method of preparing a dyeable fiber-spinning composition which comprises blending (A) a polymer of at least 80 percent by weight of acrylonitrile and up to 20 percent of another mono-olefinic monomer copolymerizable therewith, and (B) a polymer of at least 30 percent by weight of an alkenyl haloacetate of the structure:

$$\text{R}-\text{O}-\overset{\overset{\text{O}}{\|}}{\text{C}}-\text{CH}_2-\text{X}$$

wherein X is a halogen atom selected from the group consisting of chlorine and bromine and R is a radical selected from the group consisting of vinyl, allyl, methallyl and isopropenyl, and up to 70 percent of another mono-olefinic monomer copolymerizable therewith, the only source of alkenyl haloacetate in the blend being the (B) polymer, the polymers being blended in such proportions that from 2 to 20 percent of the total weight is the said alkenyl haloacetate, and reacting the blended polymer with a compound of the group consisting of mercapto substituted N-heterocyclic compounds, wherein the mercapto group is substituted on a carbon atom, and alkali metal salts thereof.

2. A dyeable fiber-spinning composition comprising a blend of (A) a polymer of at least 80 percent by weight of acrylonitrile and up to 20 percent of another mono-olefinic monomer copolymerizable therewith and (B) a polymer of at least 30 percent by weight of an alkenyl haloacetate of the structure:

$$\text{R}-\text{O}-\overset{\overset{\text{O}}{\|}}{\text{C}}-\text{CH}_2-\text{X}$$

wherein X is a halogen atom selected from the group consisting of chlorine and bromine and R is a radical selected from the group consisting of vinyl, allyl, methallyl and isopropenyl, and up to 70 percent of another mono-olefinic monomer copolymerizable therewith, and wherein the only source of the alkenyl haloacetate in the blend is the (B) polymer, the polymers being blended in such proportions that from 2 to 20 percent of the total weight is the said alkenyl haloacetate, the said blend having been reacted with a compound of the group consisting of mercapto substituted N-heterocyclic compounds, wherein the mercapto group is substituted on a carbon atom, and alkali metal salts thereof.

3. A method of preparing a dyeable fiber-spinning composition which comprises reacting (A) a polymer of at least 30 percent by weight of an alkenyl haloacetate of the structure:

$$\text{R}-\text{O}-\overset{\overset{\text{O}}{\|}}{\text{C}}-\text{CH}_2-\text{X}$$

wherein X is a halogen atom selected from the group consisting of chlorine and bromine and R is a radical selected from the group consisting of vinyl, allyl, methallyl and isopropenyl, and up to 70 percent of another mono-olefinic monomer copolymerizable therewith, with a compound of the group consisting of mercapto substituted N-heterocyclic compounds wherein the mercapto group is substituted on a carbon atom, and alkali metal salts thereof, and blending the so reacted polymer with (B) a polymer of at least 80 percent by weight of acrylonitrile and up to 20 percent of another mono-olefinic monomer copolymerizable therewith, said polymer (A) being the only source of alkenyl haloacetate in the blend and the polymers being blended in such proportions that from 2 to 20 percent of the total weight is the said alkenyl haloacetate.

4. A dyeable fiber-spinning composition comprising a blend of (A) a polymer of at least 80 percent by weight of acrylonitrile and up to 20 percent of another mono-olefinic monomer copolymerizable therewith and (B) a polymer of at least 30 percent by weight of an alkenyl haloacetate having the structure:

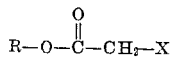

wherein X is a halogen atom selected from the group consisting of chlorine and bromine and R is a radical selected from the group consisting of vinyl, allyl, methallyl and isopropenyl, and up to 70 percent of another mono-olefinic monomer copolymerizable therewith the polymers being blended in such proportions that from 2 to 20 percent of the total weight is the said alkenyl haloacetate, said haloacetate in polymeric form having been reacted with a compound selected from the group consisting of mercapto substituted N-heterocyclic compounds wherein the mercapto group is attached to a carbon atom, and alkali metal salts of such compounds, and polymer (B) being the only source of alkenyl haloacetate in the blend.

5. A dyeable fiber-spinning composition comprising a blend of (A) a polymer of at least 80 percent by weight of acrylonitrile and up to 20 percent of another mono-olefinic monomer copolymerizable therewith selected from the group consisting of vinyl acetate, vinyl chloride, vinylidene chloride, methacrylonitrile, styrene, dialkyl fumarates, dialkyl maleates, alkyl acrylates and alkyl methacrylates wherein the alkyl groups have up to four carbon atoms, and (B) a polymer of at least 30 percent by weight of an alkenyl haloacetate of the structure:

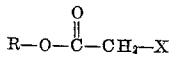

wherein X is a halogen atom selected from the group consisting of chlorine and bromine and R is a radical selected from the group consisting of vinyl, allyl, methallyl and isopropenyl, and up to 70 percent of another mono-olefinic monomer copolymerizable therewith selected from the group consisting of vinyl acetate, vinyl chloride, vinylidene chloride, acrylonitrile, methacrylonitrile, styrene, dialkyl maleates, alkyl, acrylates and alkyl methacrylates, wherein the alkyl groups have up to four carbon atoms the polymers being blended in such proportions that from 2 to 20 percent of the total weight is the said alkenyl haloacetate, the said blend having been reacted with a compound selected from the group consisting of mercapto susbtituted N-heterocyclic compounds wherein the mercapto group is attached to a carbon atom, and alkali metal salts of said compounds.

6. A dyeable fiber-spinning composition comprising a blend of (A) a polymer of at least 80 percent by weight of acrylonitrile and up to 20 percent of another mono-olefinic monomer copolymerizable therewith selected from the group consisting of vinyl acetate, vinyl chloride, vinylidene chloride, methacrylonitrile, styrene, dialkyl fumarates, dialkyl maleates, alkyl acrylates and alkyl methacrylates wherein the alkyl groups have up to four carbon atoms, and (B) a polymer of at least 30 percent by weight of an alkenyl haloacetate of the structure:

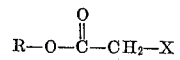

wherein X is a halogen atom selected from the group consisting of chlorine and bromine and R is a radical selected from the group consisting of vinyl, allyl, methallyl and isopropenyl, and up to 70 percent of another mono-olefinic monomer copolymerizable therewith selected from the group consisting of vinyl acetate, vinyl chloride, vinylidene chloride, acrylonitrile, methacrylonitrile, styrene, alkyl fumarates, alkyl maleates, alkyl acrylates and alkyl methacrylates, wherein the alkyl groups have up to four carbon atoms, the polymers being blended in such proportions that from 2 to 20 percent of the total weight is the said alkenyl haloacetate, the said haloactate in polymeric form having been reacted with a compound of the group consisting of mercapto substituted N-heterocyclic compounds wherein the mercapto group is attached to a carbon atom, and alkali metal salts of said compounds.

7. A dyeable composition as defined in claim 2 wherein the haloacetate is vinyl chloroacetate.

8. A dyeable composition as defined in claim 2 wherein the haloacetate is allyl chloroacetate.

9. A dyeable composition as defined in claim 2 wherein the haloacetate is methallyl chloroacetate.

10. A dyeable composition as defined in claim 2 wherein the haloacetate is isopropenyl chloroacetate.

11. A dyeable composition as defined in claim 4 wherein the haloacetate is vinyl chloroacetate.

12. A dyeable composition as defined in claim 4 wherein the haloacetate is allyl chloroacetate.

13. A dyeable composition as defined in claim 4 wherein the haloacetate is methallyl chloroacetate.

14. A dyeable composition as defined in claim 4 wherein the haloacetate is isopropenyl chloroacetate.

15. A dyeable composition as defined in claim 2 wherein the compound is mercaptobenzothiazole.

16. A dyeable composition as dfined in claim 2 wherein the compound is an alkali metal salt of mercaptobenzothiazole.

17. A dyeable composition as defined in claim 2 wherein the compound is the sodium salt of mercaptobenzothiazole.

18. A dyeable composition as defined in claim 4 wherein the compound is mercaptobenzothiazole.

19. A dyeable composition as defined in claim 4 wherein the compound is an alkali metal salt of mercaptobenzothiazole.

20. A dyeable composition as defined in claim 4 wherein the compound is the sodium salt of mercaptobenzothiazole.

References Cited in the file of this patent

UNITED STATES PATENTS

| 2,643,992 | Gluesenkamp et al. | June 30, 1953 |
| 2,688,008 | Chaney et al. | Aug. 31, 1954 |